United States Patent
Labonte et al.

(10) Patent No.: US 11,265,269 B2
(45) Date of Patent: Mar. 1, 2022

(54) NETWORKING SYSTEM HAVING MULTIPLE COMPONENTS WITH MULTIPLE LOCI OF CONTROL

(71) Applicant: Arista Networks, Inc., Santa Clara, CA (US)

(72) Inventors: Francois Labonte, Menlo Park, CA (US); Kartik Chandran, Los Altos, CA (US); Eswaran Baskaran, Los Altos, CA (US); Hugh Weber Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/886,417

(22) Filed: May 28, 2020

(65) Prior Publication Data

US 2021/0273891 A1  Sep. 2, 2021

Related U.S. Application Data

(60) Provisional application No. 62/984,121, filed on Mar. 2, 2020.

(51) Int. Cl.
*H04L 12/54* (2013.01)
*H04L 49/00* (2022.01)
*H04L 49/25* (2022.01)

(52) U.S. Cl.
CPC ........ *H04L 49/3045* (2013.01); *H04L 49/252* (2013.01)

(58) Field of Classification Search
CPC ....... H04L 49/252; H04L 49/00; H04L 49/48; H04L 49/70; H04L 49/10
See application file for complete search history.

(56) References Cited

U.S. PATENT DOCUMENTS

| | | | | |
|---|---|---|---|---|
| 6,735,198 B1* | 5/2004 | Edsall | ..................... | H04L 45/54 370/389 |
| 7,120,160 B2* | 10/2006 | Takase | ................ | H04L 49/3045 370/415 |
| 7,633,955 B1* | 12/2009 | Saraiya | ................. | H04L 49/356 370/395.31 |
| 10,721,187 B1* | 7/2020 | Goldman | .............. | H04L 49/206 |
| 2004/0100980 A1* | 5/2004 | Jacobs | .................... | H04L 49/90 370/412 |
| 2012/0163175 A1* | 6/2012 | Gupta | .................... | H04L 47/10 370/235 |
| 2021/0176171 A1* | 6/2021 | Frink | ..................... | H04L 45/74 |

* cited by examiner

*Primary Examiner* — Abdelnabi O Musa
(74) *Attorney, Agent, or Firm* — Fountainhead Law Group P.C.

(57) ABSTRACT

Each switch unit in a networking system shares its local state information among other switch units in the networking system, collectively referred to as the shared forwarding state. Each switch unit creates a respective set of output queues that correspond to ports on other switch unites based on the shared forwarding state. A received packet on an ingress switch unit operating in accordance with a first routing protocol instance can be enqueued on an output queue in the ingress switch; the packet is subsequently processed by the egress switch unit, operating in accordance with a second routing protocol instance that corresponds to the output queue.

21 Claims, 10 Drawing Sheets

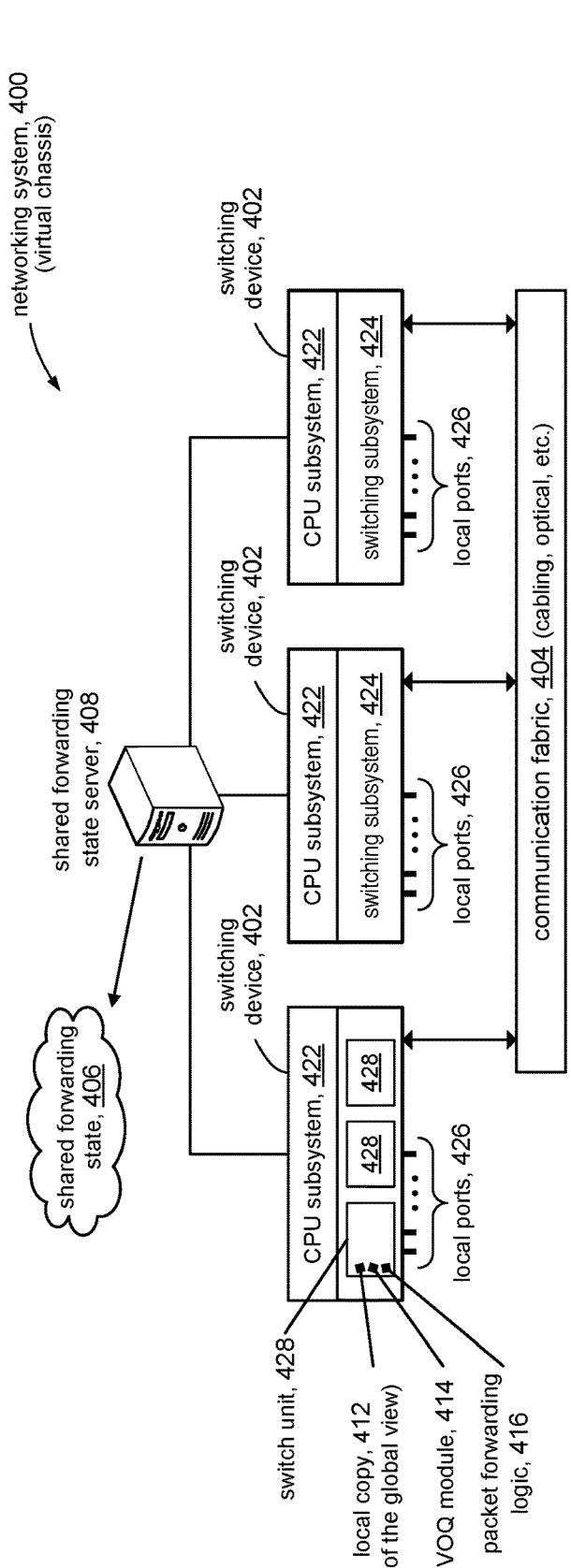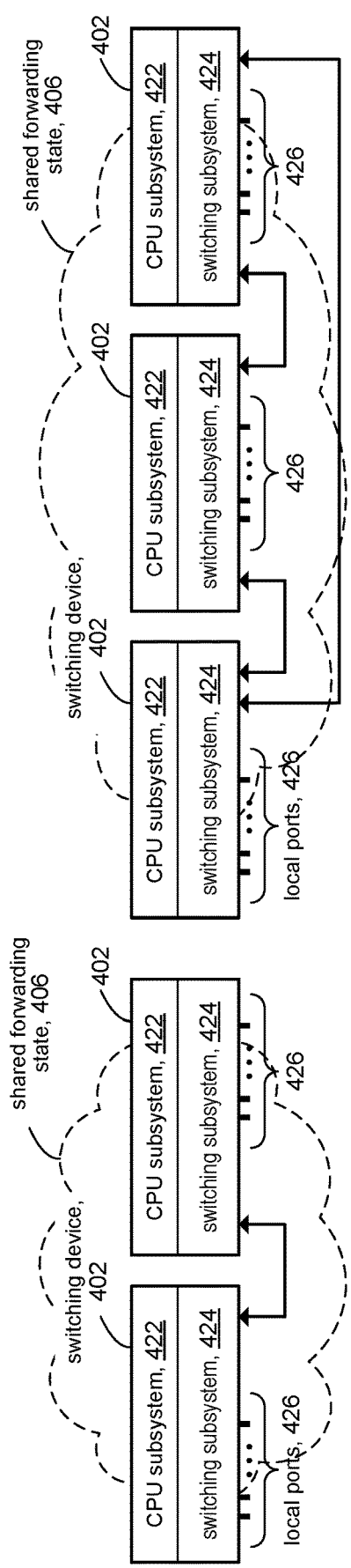
FIG. 4A
FIG. 4B
FIG. 4C

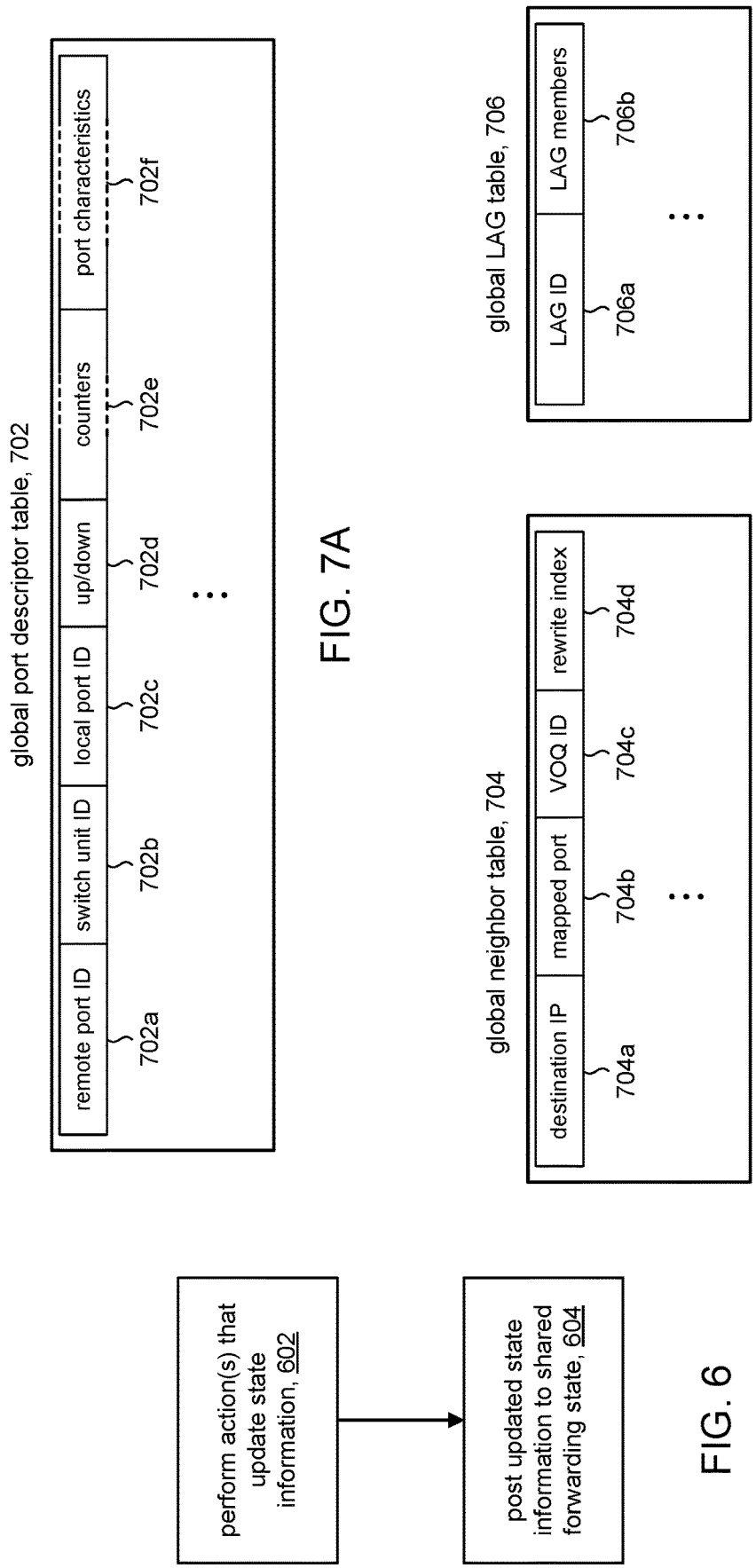

NETWORKING SYSTEM HAVING MULTIPLE COMPONENTS WITH MULTIPLE LOCI OF CONTROL

CROSS REFERENCE TO RELATED APPLICATIONS

Pursuant to 35 U.S.C. § 119(e), this application is entitled to and claims the benefit of the filing date of U.S. Provisional App. No. 62/984,121 filed Mar. 2, 2020, the content of which is incorporated herein by reference in its entirety for all purposes.

BACKGROUND

A networking system can comprise several switch units (also referred to as packet processors, packet processing engines, and the like) housed in a chassis to switch packets of information between host machines connected to the networking system. Each switching unit includes physical ports (e.g., wired connections, optical connection, wireless connections, etc.) to which a host machine connects. A host machine connected to a port on a given switch unit can send a packet to another host machine connected to another port on the same switch unit or to a port on another switch unit.

In the latter use case, where the destination host machine is connected to a switch unit that is different from the source host machine, the processing involves multiple loci of control. The first locus of control is in the ingress switch unit to which the source host is connected. The ingress switch unit performs a forwarding lookup operation to determine where to send the received packet. This typically involves parsing the received packet and doing table lookups using the identified data fields. The second locus of control is in the egress switch unit to which the destination host is connected. The egress switch unit performs a similar forwarding lookup operation to determine the port on which to send the packet. This process is sometimes referred to as distributed forwarding, where the forwarding process involves processing in multiple switching units.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 4A, 4B, 4C are block diagrams illustrating various configurations of fixed-configuration switches in accordance with some embodiments of the present disclosure.

FIG. 6 illustrates posting of updated state information in a switch unit to a shared forwarding state in accordance with some embodiments of the present disclosure.

FIGS. 7A, 7B, 7C show illustrative tables of information comprising a shared forwarding state in accordance with some embodiments of the present disclosure.

DETAILED DESCRIPTION

In accordance with the present disclosure, forwarding state information in a system of switch units can be shared among the switch units. A packet that ingresses on one switch unit (ingress switch unit) and egresses on a different switch unit (egress switch unit) can be processed by the ingress switch unit using the shared forwarding state to identify the egress switch unit and egress port. The ingress switch unit can also identify the rewrite action to be performed by the egress switch unit using the shared forwarding state. The egress switch unit therefore does not need to perform a forwarding lookup operation to identify an egress port; that work has already been performed by the ingress switch unit. The egress switch unit only needs to modify the packet according rewrite actions that were already identified by the ingress switch unit.

Embodiments in accordance with the present disclosure avoid the so-called multi-stage distributed forwarding that is common in conventional systems by providing a shared forwarding state that allows forwarding information to be determined in a single forwarding operation that is performed in the ingress switch, and hence can improve packet forwarding throughput.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
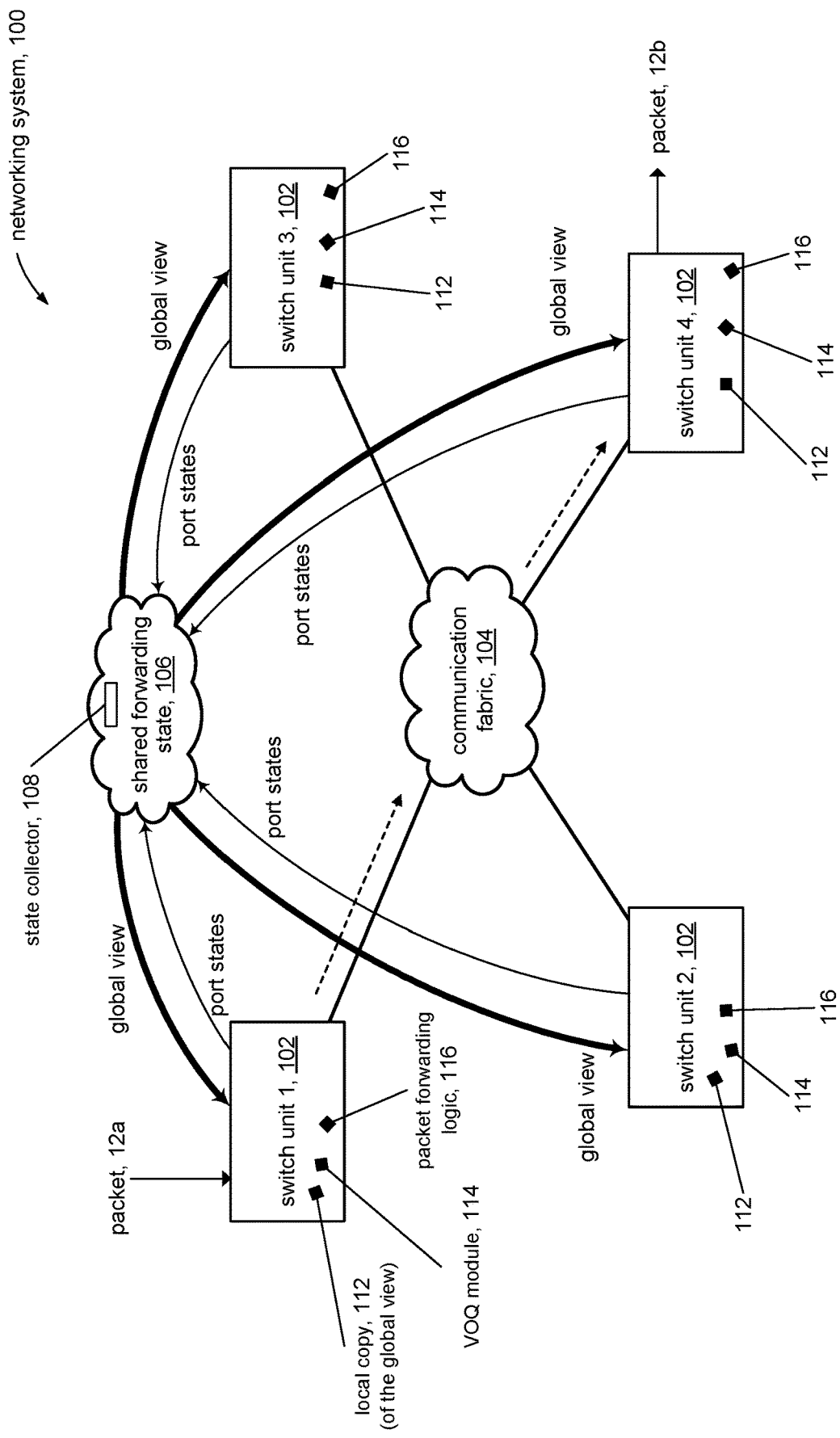
FIG. 1 is a generalized representation of a networking system in accordance with some embodiments of the present disclosure.

FIG. 1 is a generalized representation of a networking system in accordance with the present disclosure. In some embodiments, networking system 100 can include a network of switch units (packet engines, packet processing engines, and the like) 102 interconnected by communication fabric 104. The communication fabric can provide communication paths for forwarding packets among switch units 102. For example, switch unit 1 may receive (ingress) packet 12*a* on one of its local ports (not shown) and may forward the packet to switch unit 4 via communication fabric 104, to be transmitted as (egress) packet 12b on a local port (not shown) of switch unit 4.

In accordance with the present disclosure, switch units 102 can share their state information with each other. In some embodiments, for example, networking system 100 can include shared forwarding state 106, which represents a global view of the state of switch units 102 that comprise the networking system. As explained below, shared forwarding state 106 can be used by an ingress switch unit (e.g., switch unit 1) to determine that an ingress packet (e.g., packet 12a) needs to be forwarded on a remote port on an egress switch unit (e.g., switch unit 4). Accordingly, shared forwarding state 106 can include state information that is associated with the local ports of the switch units in networking system 100. Thus, for example, shared forwarding state 106 can be a compilation of state information (e.g., port status, configuration, statistics, etc.) reported by switch unit 1, switch unit 2, switch unit 3, switch unit 4, and so on. In addition, switch units 102 can report any subsequent updates to their operating state so that shared forwarding state 106 can represent the current state of switch units 102 in networking system 100.

Shared forwarding state 106 can be embodied in any suitable manner. In some embodiments, for example, shared forwarding state 106 can persist in a central database (DB) that stores the state information received from switch units 102. In some embodiments, for example, a state collector module 108 can communicate with switch units 102 to collect state information from each switch unit and store or otherwise aggregate the collected state information in shared forwarding state 106. In other embodiments, shared forwarding state 106 can be shared directly with the other switch units, for example, via a mesh network, rather than being collected and stored in a centralized location. These aspects of the present disclosure are further illustrated below.

In accordance with the present disclosure, shared forwarding state 106 represents a global view of networking system 100 that can be pushed down or otherwise provided to each switch unit 102, and stored in the switch unit as its own local copy 112 of the global view. Switch units 102 can include virtual output queue module 114 to access a set of virtual output queues (VOQs) according their local copies of the global view. Switch units 102 can be configured with packet forwarding logic 116 to process ingress packets including enqueueing/dequeuing packets with the virtual output queues. Details of these aspects of the present disclosure are discussed below. Briefly, however, packet forwarding logic 116 in an ingress switch unit can process an ingress packet using forwarding information contained in its local copy of the global view to determine the port on which to forward the packet. The port can be one of the ports (local ports) of the ingress switch unit, or the port can be a port (remote port) on another (egress) switch unit. If the port is a remote port, the packet can be enqueued on a virtual output queue associated with that remote port which is then subsequently processed by the egress switch unit.

Figure 2:
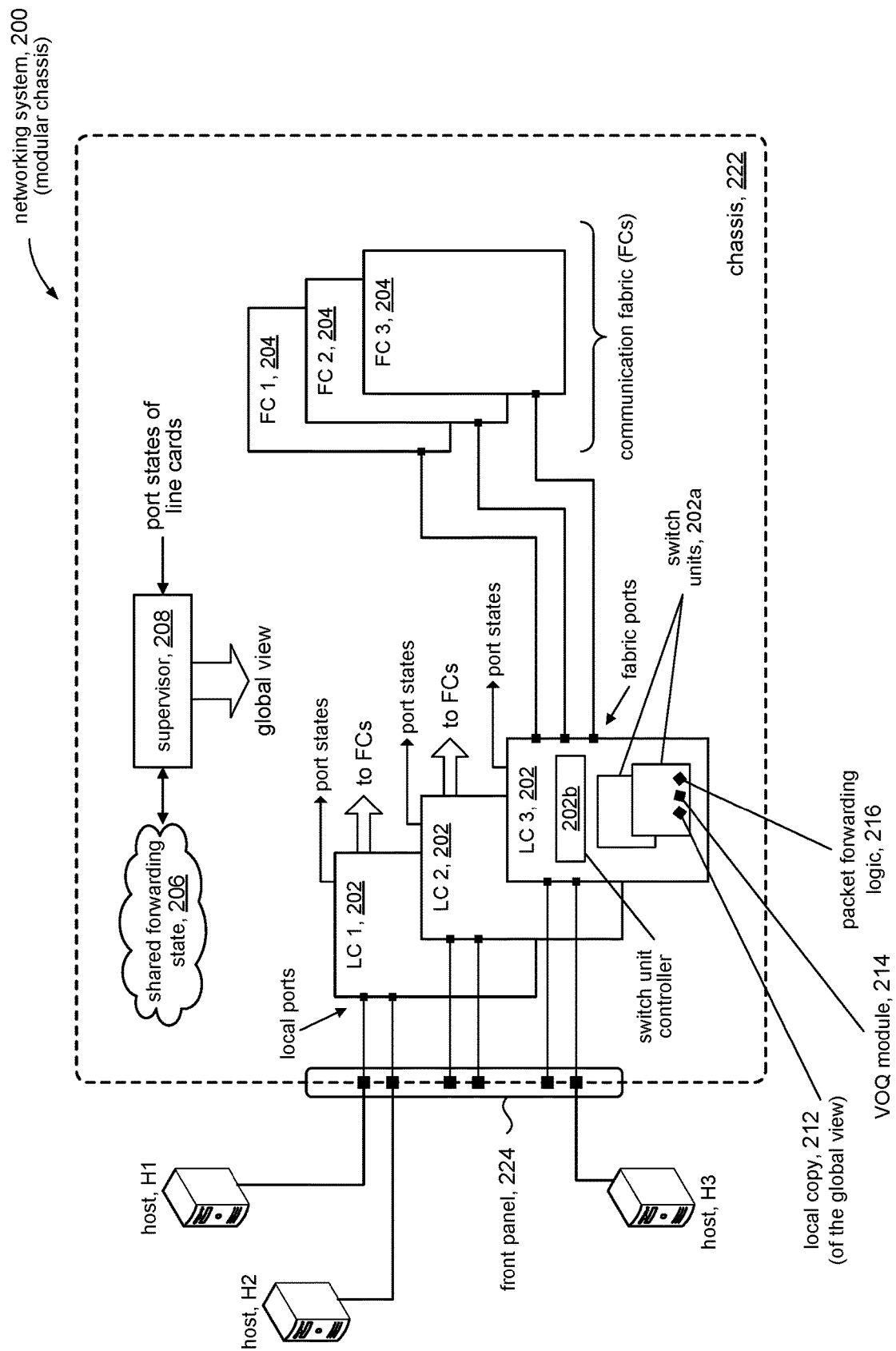
FIG. 2 is a block diagram of a modular chassis in accordance with some embodiments of the present disclosure.
Figure 3:
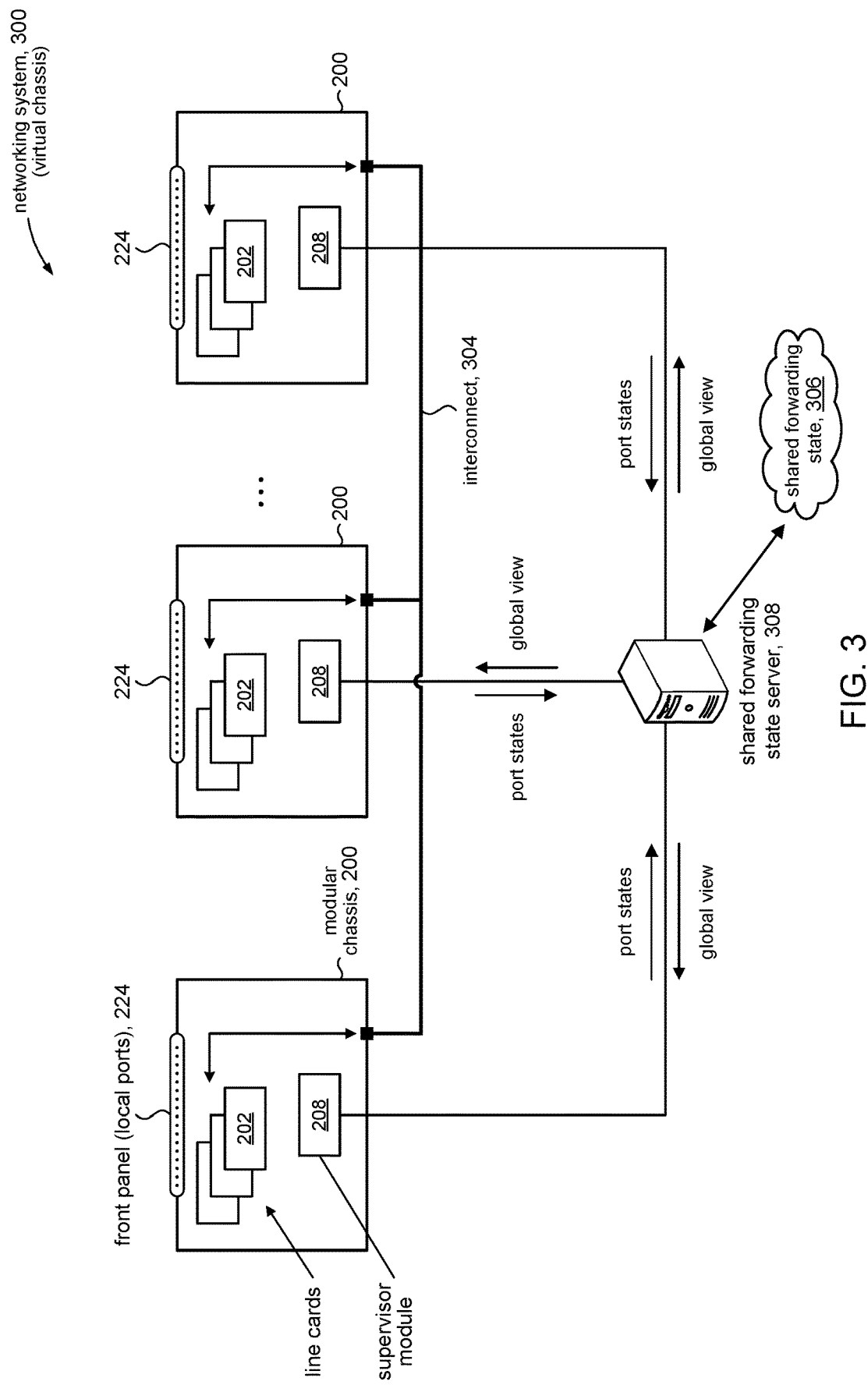
FIG. 3 is a block diagram of a system of modular chassis in accordance with some embodiments of the present disclosure.

The discussion will now turn to a description of some illustrative configurations of switch units 102 in accordance with the present disclosure. Switch units 102 in accordance with the present disclosure can be configured in different ways. As illustrated in FIGS. 2 and 3, for example, in some embodiments, switch units 102 can be incorporated in switching components in a modular device. As illustrated in FIGS. 4A-4C, in other embodiments, switch units 102 can be incorporated in self-contained fixed-configuration devices.

FIG. 2 is a block diagram of an illustrative embodiment of a networking system (modular chassis 200) in accordance with the present disclosure. In some embodiments, for example, switch units can be incorporated components referred to as line cards. Line cards, in turn can be incorporated into modular chassis 200. Each line card 202 can include one or more switch units (packet processors) that comprise the data plane component of the line card. Line card LC 3, for example, shows a line card having two switch units 202a.

Each line card 202 can include a switch unit controller 202b to control its constituent switch unit(s). In some embodiments, such as line card LC 3, switch unit controller 202b can control several switch units. The switch unit controller runs a software stack that implements a routing protocol instance and various data plane control drivers that control the switch unit. In accordance with embodiments of the present disclosure switch unit controllers 202b in different line cards 202 within the same modular chassis can support instances of different routing protocols; e.g., border gateway protocol (BGP), open shortest path first (OSPF), intermediate system to intermediate system (IS-IS), and so on. For example, some line cards can process packets according to one routing protocol instance (e.g., an instance of the routing protocol BGP) while other line cards can process packets according to another routing protocol instance (e.g., an instance of the OSPF routing protocol). Merely to illustrate the point, the switch unit(s) in line card LC 1 may run an instance of the BGP routing protocol, while switch unit(s) line card LC 2 may run a separate instance of the BGP routing protocol, switch units in line card LC 3 may run a routing protocol instance (e.g., OSPF) that is different from LC 1 and LC 2, and so on. It will be appreciated that some line cards can run separate instances of the same routing protocol.

FIG. 2 shows line cards 202 assembled in chassis 222 of modular chassis 200. Modular chassis 200 is "modular" in that line cards 202 can be added to and removed from chassis 222 to change the capacity and capabilities of the switch. Chassis 222 can include front panel 224 to expose the local ports of the switch units so that host machines can connect to the switch units.

Each line card 202 can store local copy 212 of the global view that is represented by shared forwarding state 206. Each switch unit in the line card can be configured with VOQ module 214. Each switch unit can include packet forwarding logic 216 to process packets in accordance with the present disclosure.

Chassis 222 can house a communication fabric comprising a set of fabric cards 204. Each line card 202 can include a set of fabric ports for connecting the switch unit(s) in the line card to respective fabric cards 204 comprising the communication fabric. Although the illustrative embodiment shown in FIG. 2 depicts three line cards 202 and three fabric cards 204, it will be appreciated that in other embodiments modular chassis 200 can be provisioned with different numbers of line cards and fabric cards.

Chassis 222 can house supervisor module 208 to configure line cards 202 and fabric cards 204 and otherwise manage/control various operations in the chassis. Supervisor module 208 can carry out control plane operations, manage the various components comprising modular chassis 200 (e.g., power supply, cooling fans, etc.), and so on. In accordance with some embodiments, supervisor module 208 can manage shared forwarding state 206. In some embodiments, for example, line cards 202 can communicate with supervisor module 208 to upload various state information, including switch unit forwarding state, to shared forwarding state 206, and conversely to synchronize their respective local copies 212 of the global view to the shared forwarding state.

Supervisor module 208 can be configured to manage the communication fabric comprising networking system 200. Alternatively, in some embodiments, the chassis 222 can include a fabric management unit (not shown) to mange the entire the communication fabric.

Supervisor module 208 can receive status information for each line card and fabric card in chassis 222. In some embodiments, for example, the switch unit controller in each line card can collect environmental status information (e.g., temperature, fan operation, etc.) and provide the collected information to supervisor module 208. The switch unit controller in each line card can collect operational status information, including various counters for its line card (e.g., number of packets received, dropped, etc., VOQ counters, etc.), fabric link status, and so on, and provide the collected information to supervisor module 208. Supervisor module 208 can aggregate the various information received from the individual switch unit controllers to provide system-level views of the health of the system.

As shown in FIG. 2, shared forwarding state 206 can be maintained within modular chassis 200 itself. In some embodiments, for example, supervisor module 208 can be a computer subsystem having a CPU, a memory, and a storage device. Shared forwarding state 206 can be maintained as a database on the storage device of supervisor module 208. In other embodiments (not shown), shared forwarding state 206 can be maintained on another computer system (e.g., a server) that is separate from modular chassis 200, but is otherwise accessible by supervisor module 208.

Networking system 200 depicted in FIG. 2 represents an example of a distributed switch fabric that comprises switch units 202a assembled in line cards 202 that are installed in a modular chassis. The switch units collectively define a switch fabric in conjunction with the communication fabric. Referring to networking system 300 in FIG. 3, in some embodiments a distributed switch fabric can be a virtual chassis comprising several interconnected modular chassis (e.g., 200, FIG. 2). An interconnect 304 (e.g., cabling, optical fiber, etc.) can provide a communication fabric among line cards 202 across the several modular chassis so that a packet received by the switch unit on a line card in one modular chassis can be forwarded to the switch unit on a line card in another modular chassis.

Shared forwarding state server 308 can manage and otherwise maintain shared forwarding state 306 which represents the switch unit state of the switch units in line cards 202 across modular chassis 200 comprising the virtual chassis. Supervisor module 208 in each modular chassis 200 can be in communication with shared forwarding state server 308 to upload state information from its respective line cards 202, and to download the global view from shared forwarding state 306 to each of its respective line cards.

Referring to FIGS. 4A-4C, switch units can be incorporated in a self-contained fixed-configuration device that has a fixed number of switch units. This configuration is sometimes referred to as a "pizza box" switch because of its form factor. FIG. 4A, for example, shows an example of a distributed switch fabric in networking system 400 comprising several fixed-configuration switching devices 402 that operate as a virtual chassis. Each switching device 402 can include CPU subsystem 422 and switching subsystem 424. CPU subsystem 422 can include a CPU (not shown) to provide control plane operations for the switching device. Switching subsystem 424 can comprise one or more switch units 428, which receive and process ingress packets. Host machines (not shown) can be connected directly to a switching device via the local ports 426 of its switch unit(s). Each switching device 402 can connect to external communication fabric 404 so that the switching devices can transmit packets to and receive packets from each other.

Shared forwarding state 406 can be maintained by shared forwarding state server 408. CPU subsystem 422 in each switching device 402 can communicate its state information (e.g., port status) to shared forwarding state 406 via server 408. The server, in turn, can push the global view to each switching device 402, where a local copy 412 of the global view can be stored. Each switch unit 428 in switching subsystem 424 can be configured with VOQ module 414 and packet forwarding logic 416 to process packets in accordance with the present disclosure.

Networking system 400 depicted in FIG. 4A can be referred to as a Clos network. It will be appreciated, however, that the networking system can be configured according to other architectures such as a mesh network. FIGS. 4B and 4C, for example, illustrate virtual chassis comprising meshed-connected switching devices 402. FIG. 4B shows a networking system comprising a mesh of two switching devices connected by a suitable interconnect. FIG. 4C shows a mesh of three switching devices. In some embodiments, shared forwarding state 406 in a mesh-connected network need not be persisted in a database, but rather can be represented by a copy of the global view that is locally stored (e.g., 412, FIG. 4A) in each switching device 402. A switching device can directly communicate updates of its state to every other switching device using the mesh network.

Figure 5A:
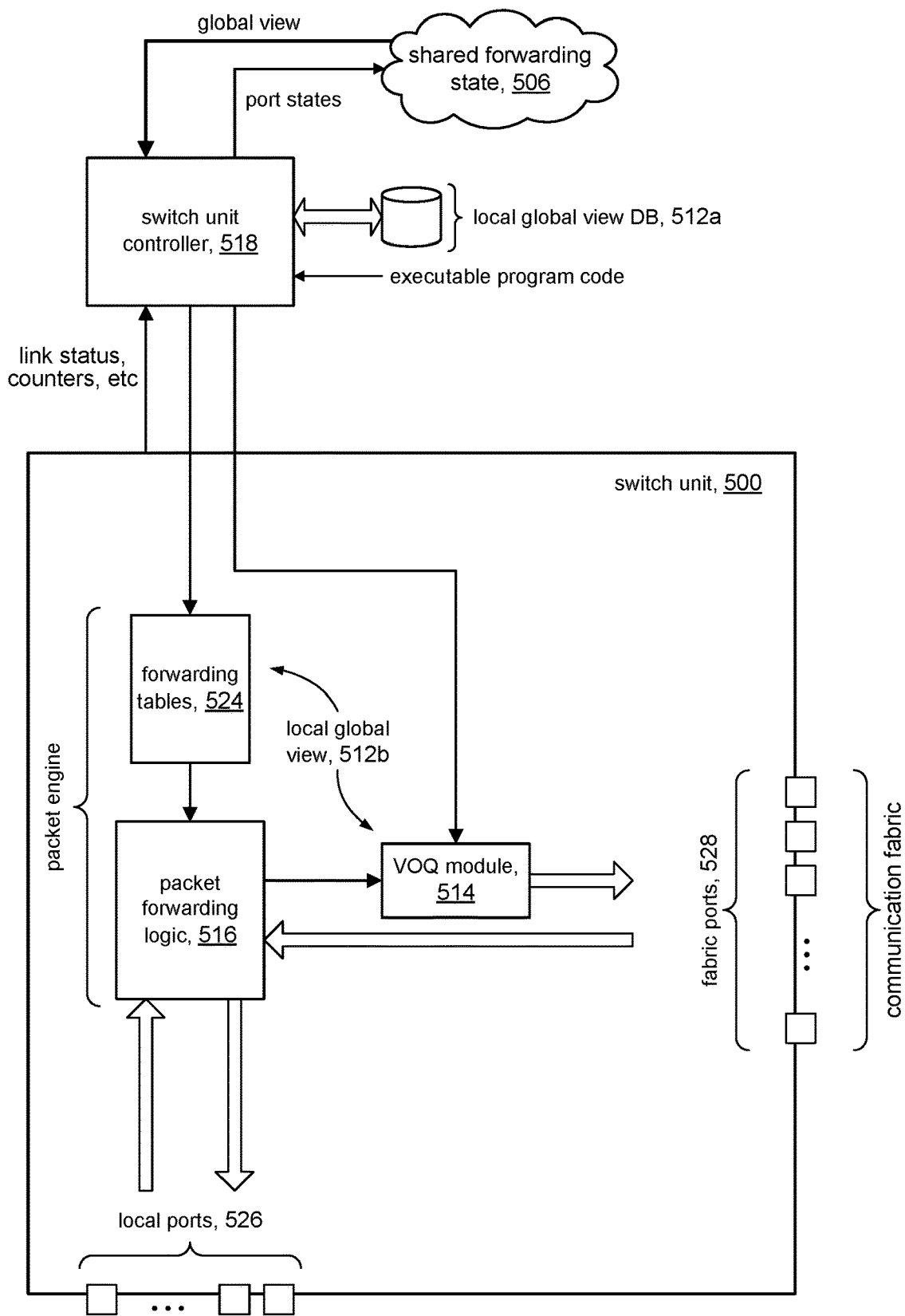
FIGS. 5A and 5B illustrate aspects of a switch unit in accordance with some embodiments of the present disclosure.

Referring to FIG. 5A, details of a switching unit in accordance with the present disclosure are illustrated. In some embodiments, for example, switching unit 500 can be incorporated in the line cards in a modular chassis, such as shown in FIG. 2. In other embodiments, switch unit 500 can be incorporated in the switching subsystem in a fixed configuration switch, such as shown in FIG. 4A for instance.

Switch unit controller 518 can exchange state information with shared forwarding state 506 and configure switch unit 500 according to the shared forwarding state. In some embodiments, for example, switch unit controller 518 can provide forwarding table information and VOQ configuration information to switch unit 500. Switch unit controller 518 can receive from switch unit 500 state information such as link status, counters, etc., which can then be uploaded to shared forwarding state 506.

In some embodiments, a local copy of the global view obtained from shared forwarding state 506 can be embodied in various data structures in switch unit controller 518. In some embodiments, for example, a portion of the local copy of the global view can be maintained in DB 512a. Another portion of the local copy of the global view can be embodied, as local global view 512b, in forwarding table 524 and in VOQ module 514. Switch unit controller 518, for example, can load/program forwarding information into forwarding table 524 and VOQ configuration information into VOQ module 514. These aspects of the present disclosure are discussed in more detail below.

Packet forwarding logic 516 can receive (ingress) packets on its local ports 526 and on fabric ports 528. Local ports 526 allow host machines (not shown) to be connected directly (e.g., wired or wirelessly) to switch unit 500. Switch unit 500 can bridge packets from a host machine connected to one of the local ports 526 to another host machine connected to another one of the local ports. Fabric ports 528 connect switch unit 500 to other switch units (not shown) in the networking system, allowing switch unit 500 to route packets to other switch units and to receive packets routed from other switch units. In some embodiments, for example, fabric ports 528 can connect switch unit 500 to fabric cards (e.g., 204, FIG. 2). In some embodiments, fabric ports 528 can interconnect switch units via cabling, such as shown in FIG. 4A for example. In other embodiments, fabric ports 528 can interconnect switch units via a mesh network, such as illustrated in FIGS. 4B and 4C for example; and so on.

Packet forwarding logic 516 can use information in forwarding table 524 to perform standard forwarding lookup operations to identify an egress port on which to forward a received packet. The egress port can be one of the local ports 526 of switch unit 500. The egress port can be a port on another switch unit. In accordance with the present disclosure packets can be enqueued on a virtual output queues via VOQ module 514 in order to pass the packet to the other switch unit. This aspect of the present disclosure is discussed in more detail below.

Figure 5B:
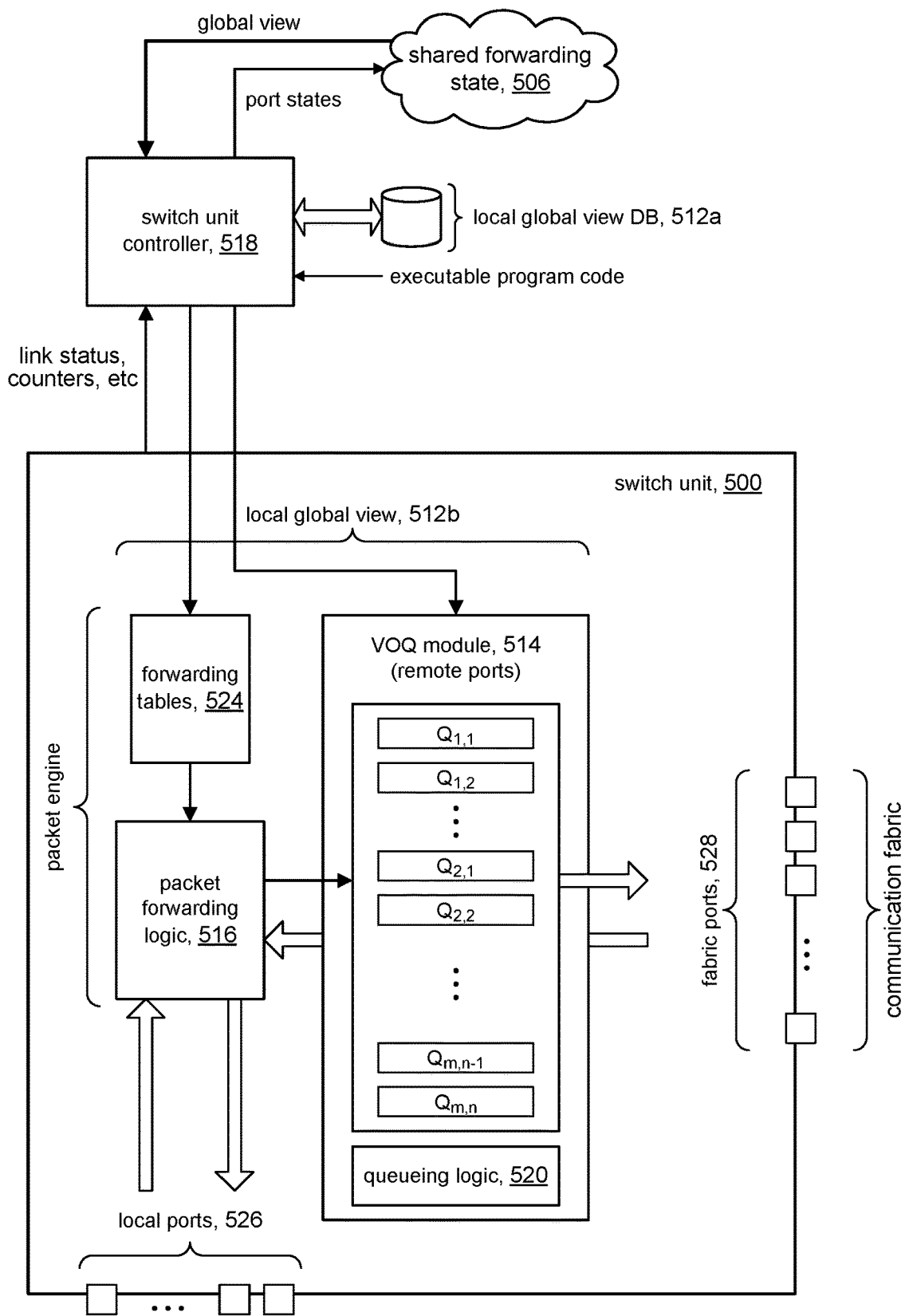

FIG. 5B shows additional details of VOQ module 514 in switch unit 500. In accordance with some embodiments, for example, VOQ module 514 can access a set of virtual output queues $Q_{x,y}$ that are associated with respective (remote) ports on respective switch units in the networking system.

Virtual output queues are known and their underlying mechanisms are well understood. Briefly, however, virtual output queues allow a system of switch units (e.g., FIGS. 2, 3, 4A-4C) to communicate packets with each other. The underlying queuing mechanism of virtual output queues can be built on top of a communication fabric (e.g., FIG. 2) within a chassis or on an interconnect between multiple modules (e.g., FIG. 3). The underlying queueing mechanism provides a suitable interface for switch units to enqueue data on virtual output queues and to dequeue data from virtual output queues. A virtual output queue can be associated with each port on each switch unit. When a switch unit wants to communicate a packet to a port on another switch unit, the packet can be enqueued on a virtual output queue that is associated with that specific port. The other switch unit can dequeue packets for processing.

Referring to FIG. 5B, for example, while switch unit 500 can be connected to other switch units via fabric ports 528, virtual output queues allow the switch unit to send packets to specific ports on other switch units. In accordance with the present disclosure, the shared forwarding state can include information that identifies virtual output queues and their corresponding ports. For example, each virtual output queue $Q_{x,y}$ shown in FIG. 5B is associated with a port on a remote switch unit, where index x indicates the remote switch unit and index y designates the port on that remote switch unit. For example, queue $Q_{1,2}$ is associated with the second port on remote switch unit 1 (not shown), queue $Q_{2,1}$ is associated with the first port on remote switch unit 2, queue $Q_{m,n-1}$ is associated with the $(n-1)^{th}$ port on a remote switch unit m, and so on. VOQ module 514 can include queueing logic 520 to access the virtual output queues and coordinate with packet forwarding logic 516 to enqueue packets on the virtual output queues in accordance with the present disclosure.

Referring to FIG. 6, the discussion will now turn to a high-level description of processing in a switch unit (e.g., 102, FIG. 1) for posting state information associated with the switch unit to the shared forwarding state (e.g., 106, FIG. 1) in accordance with the present disclosure. In some embodiments, for example, the switch unit can include one or more digital processing units, which when operated, can cause the switch unit to perform processing in accordance with FIG. 6. Digital processing units can include general CPUs that operate by way of executing computer program code stored on a non-volatile computer readable storage medium (e.g., read-only memory, ROM). Digital processing units can include specialized processors such as digital signal processors, graphics coprocessors, field programmable arrays, application specific integrated circuits, etc. that operate by way of executing computer program code or operate by way of being configured for specific operations by program code; for example, packet forwarding logic 516, FIG. 5A can be a specialized processor. The flow of operations performed by the switch unit is not necessarily limited to the order of operations shown.

At operation 602, the switch unit updates it state information. State information in a switch unit can be manually updated; e.g., by a system administrator. State information can be autonomously updated; e.g., MAC address learning, ARP learning, packet counters get incremented, and so on. For purposes of the present disclosure, state information will be understood to include generally static information that is associated with the switch unit such as switch unit identifier (ID), number of physical ports on the switch unit, system port ID of each physical port, and so on. State information can also include dynamic information such as media access control (MAC) address mappings, up/down state of each of the switch unit's ports, port speeds, operational statistics, and so on. Updates to the switch unit's state information can be manual (e.g., by a system administrator) or autonomous (e.g., source MAC learning, auto-detection of events, etc.). An illustrative and non-exhaustive example of the kind of state information that is in the switch unit is discussed below in connection with FIGS. 7A-7C.

At operation 604, the switch unit posts (pushes) its updated state information to the shared forwarding state in order to update the shared forwarding state. In accordance with the present disclosure, every switch unit in the networking system can push its updated state information so that the shared forwarding state can maintain a current view of the networking system. In some embodiments, the posting of updated state information can be event-driven; e.g., the switch unit can post updated state information in response to detecting that its state information has been updated. In the case of a shared state server (e.g., 308, FIG. 3), for instance, the switch unit can communicate with the server to upload its state information to the server. In other embodiments, the posting of updated state information can be a periodic activity; e.g., the switch unit can periodically poll its state and post any state information that has been updated. In still other embodiments, a shared forwarding state server (e.g., 408, FIG. 4) can periodically poll each switch unit and pull state information from the switch unit.

In some embodiments, the switch units can be connected in a mesh network, such as depicted in FIGS. 4B and 4C for example. In a mesh network, the switch unit can communicate its updated state information directly to each switch unit in the mesh network.

The discussion will now turn to a description of the shared forwarding state in accordance with some embodiments. The discussion will then continue with a description of using the shared forwarding state to create virtual output queues and forwarding using the virtual output queues.

As indicated above, in some embodiments the shared forwarding state can be managed at a single source. In a modular chassis configuration (FIG. 2), for example, a supervisor module can store and manage the shared forwarding state. In some embodiments, an external shared state server (FIG. 3) can store and manage the shared forwarding state, and so on. In other embodiments, the shared forwarding state need not be persisted, but can be stored directly among the switch units (FIGS. 4A, 4B).

FIGS. 7A, 7B, and 7C collectively illustrate an example of information comprising the shared forwarding state in accordance with the present disclosure (e.g., 106, FIG. 1). As explained above, the information comprising the shared forwarding state is compiled from state information received from the switch units. In some embodiments, for example, a state collection module (e.g., 108, FIG. 1, 208, FIG. 2) can collect state information from the individual switch units to compile a global view of the forwarding state of the system.

The examples in FIGS. 7A-7C are presented in a set of data tables. However, it will be appreciated that in other embodiments, the information comprising the shared forwarding state can be stored in any suitable data structure. It will be understood that the information shown in the figures is merely representative of the information comprising a shared forwarding state and is not intended to be exhaustive. It will be understood that in any given embodiment of the present disclosure, the information comprising the shared forwarding state can include information in addition to what is depicted in the figures. It will further be understood that in any given embodiment of the present disclosure, the information comprising the shared forwarding state can be organized and otherwise arranged differently from what is depicted in the figures.

Referring to FIG. 7A, in some embodiments the shared forwarding state can include global port descriptor table 702 that can provide descriptive state information for each remote port in the networking system. A remote port is "remote" relative to a switch unit, where that port is a physical port on another switch unit. In some embodiments, for example, global port descriptor table 702 can include a row (entry, record) of data for each port. Each row in the table can include data fields such as:

remote port ID, 702a—This port identifier can be a system port ID that uniquely identifies each physical port in the networking system across switch units. Merely to illustrate this point, the system port ID may have the form of $P_x$ that is unique among all ports across all switch units in the networking system. Referring to FIG. 2, for instance, the local ports in line card LC 1 can be assigned system port IDs $P_1$-$P_n$ (assuming there are n ports in LC 1), the local ports in line cared LC 2 can be assigned system port IDs $P_{n+1}$-$P_{n+m}$ (assuming there are m ports in LC 2), and so on. In some embodiments, for example, the system port ID can be manually assigned by a system administrator. When a switch unit is installed in the networking system, the system administrator can assign a system port ID-to-physical port mapping in a table in the switch unit.

switch unit ID, 702b—The switch unit ID can be an identifier that uniquely identifies each switch unit in the networking system.

local port ID, 702c—The local port ID can be an identifier that identifies each local port within a given switch unit in the networking system up/down state, 702d—This information indicates whether the port is UP (i.e., receiving/transmitting) packets, or DOWN (disabled).

counters (port statistics), 702e—This represents one or more data fields to hold various statistics (e.g., counters) associated with the port. Counters can track the number of packets enqueued on the port, the number of packet discards, and the like.

port characteristics, 702f—This represents one or more data fields that characterize the port. In some embodiments, for example, a port can be characterized by its settings such as the port quality of service (QOS) settings (e.g., buffer configuration for tail drop), threshold values used for random early detection (RED) and weighted RED (WRED) queueing strategies, the use of explicit congestion notification (ECN), target latency. Port characteristics 702f can include whether the port is a member of a LAG and the LAG ID (FIG. 7C), and so on.

Referring to FIG. 7B, in some embodiments the shared forwarding state can include global neighbor table 704 that maps IP addresses to ports and virtual output queues. Global neighbor table 704 represents port forwarding information for the networking system. In some embodiments, each row in global neighbor table 704 provides mapping of an IP address to a port and corresponding virtual output queue. In some embodiments, for example, destination IP data field 704a can represents the destination IP contained in an ingress packet. Mapped port data field 704b can identify the egress (forwarding) port for a packet having a given destination IP. In some embodiments, mapped port data field 704b contains the system port ID (702a, FIG. 7A). VOQ ID data field 704c is a unique identifier that identifies the virtual output queue that corresponds to the port identified in mapped port data field 704b. Rewrite index data field 704d can specify a set of one or more rewrite actions to be performed on an egress packet.

Data that populate global neighbor table 704 can come from the switch units as they populate their respective forwarding information bases (FIBs) and provide that information to a state collector (e.g., 108, FIG. 1). In some embodiments, for example, a switch unit can learn an IP address-to-port mapping using address resolution protocol (ARP) learning. In accordance with the present disclosure, the learned mapping, namely the IP address and port (e.g., its system port ID), can populate data fields 704a and 704b, respectively. The state collector can map the system port IDs to their corresponding VOQ IDs (data field 704c).

In addition, each switch unit can determine a rewrite action comprising a set of one or more actions. In accordance with the present disclosure, rewrite index data field 704c can contain a rewrite index that identifies the set of actions that the switch unit will perform on a packet before egressing the packet. The rewrite actions can be based on the destination IP of the packet.

Referring to FIG. 7C, in some embodiments the shared forwarding state can include a link aggregation group (LAG) table 706. Link aggregation refers to the aggregation of two or more physical ports (member ports) on a switch unit into a single logical port. The Link Aggregation Control Protocol (LACP) is a common protocol to manage the operation of a LAG. Each LAG is an independent instance that is managed by a separate instance of the protocol. A host computer connected to the member ports of a LAG treats those physical ports as a single port.

Every LAG has a corresponding row in LAG table 706. LAG ID data field 706a identifies a LAG by a system LAG ID. In some embodiments, the state collection module (e.g., 108, FIG. 1) can receive LAG information from each switch unit and associate a unique system LAG ID to each such LAG so that every LAG in the system is uniquely identified. In some embodiments, for example, the state collection module can establish a predetermined set of system LAG IDs for each switch unit; e.g., switch unit 1 can be allocated system LAG ID's 1-100, switch unit 2 can be allocated system LAG ID's 101-200, and so on. When a LAG is defined on a switch unit, the state collection module can assign an unused system LAG ID from the range of system LAG IDs associated with that switch unit. In this way the system LAG ID serves to identify the switch unit. LAG members data field 706b can be a list of the member ports of the LAG; for example, the member ports can be identified by their system port IDs.

Figure 8:
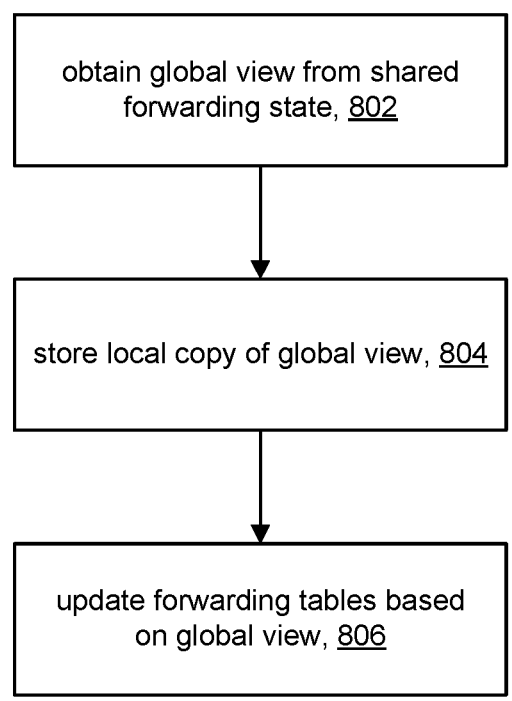
FIG. 8 illustrates processing of a shared forwarding state in a switch unit in accordance with some embodiments of the present disclosure.

Referring to FIG. 8, the discussion will now turn to a high-level description of processing in a switch unit (e.g., 102, FIG. 1) for synching to the shared forwarding state and creating virtual output queues in accordance with the present disclosure. In some embodiments, for example, the switch unit can include one or more digital processing units, which when operated, can cause the switch unit to perform processing in accordance with FIG. 8. Digital processing units can include general CPUs that operate by way of executing computer program code stored on a non-volatile computer readable storage medium (e.g., read-only memory, ROM). Digital processing units can include specialized processors such as digital signal processors, graphics coprocessors, field programmable arrays, application specific integrated circuits, etc. that operate by way of executing computer program code or operate by way of being configured for specific operations by program code; for example, packet forwarding logic 516, FIG. 5A can be a specialized processor. The flow of operations performed by the switch unit is not necessarily limited to the order of operations shown.

At operation 802, the switch unit obtains the global view from the shared forwarding state. The global view can be provided to the switch unit in any suitable manner. In some embodiments, for example, a central CPU can push the shared forwarding state to each switch unit in the networking system. In some embodiments, for example, the central CPU can be a supervisor module (e.g., 208, FIG. 2) in the modular chassis, or a shared state server (e.g., 308, FIG. 3), and so on. In other embodiments, each switch unit can be configured to pull information from the shared forwarding state. For example, the switch unit can periodically poll the shared forwarding state. In other embodiments, such as depicted in FIGS. 4B, 4C, each switch unit can obtain state information about the other switch units by communicating directly with those switch units.

At operation 804, the switch unit stores a local copy of the obtained global view in data tables provided in the switch unit, for example, for fast access to the information. Referring to FIG. 5A, in some embodiments portions of the global view can be stored in a database (e.g., 512a); for example, port descriptor table 702 shown in FIG. 7A and global LAG table 706 of FIG. 7C can be stored in a database. Portions of the global view can be manifested in the forwarding information base (e.g., forwarding table 524) of the switch unit. In some embodiments, for example, the port forwarding information in global neighbor table 704 of FIG. 7B can be incorporated in the switch unit's (local) forwarding table. In this way, the local forwarding table in the switch unit contains forwarding information for both its local ports and for remote ports (physical ports on other switch units).

At operation 806, the switch unit can update its forwarding tables with information contained in the global view. For example, forwarding tables can be programmed with information in global neighbor table 704 to include ports that are on other switch units. For example, consider a switch unit 1 and a switch unit 2. Suppose a packet ingresses on switch unit 1 that is destined for port A on switch unit 2. A forwarding lookup operation on a conventionally programmed forwarding table would identify the egress port for the packet as the port on switch unit 1 that is connected to switch unit 2. However, in accordance with the present disclosure, when the forwarding table is programmed with information in global neighbor table 704 to include ports that are on other switch units, the forwarding lookup operation will identify the egress port as port A on switch unit 2.

Figure 9:
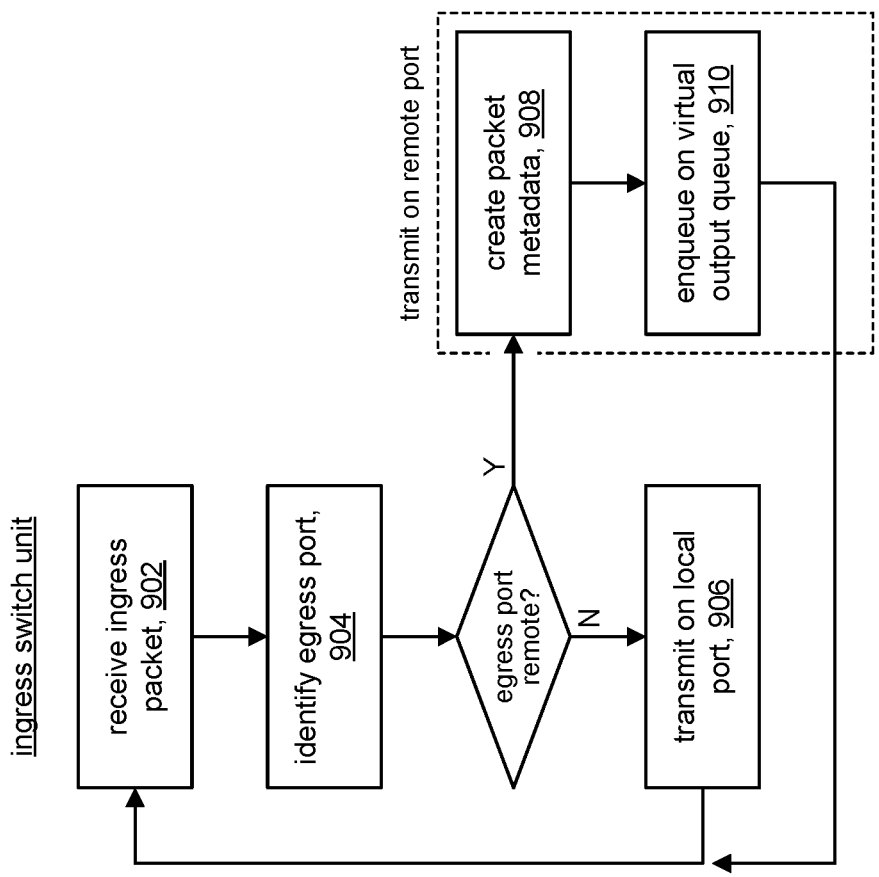
FIG. 9 shows processing of an ingress packet in a switch unit in accordance with some embodiments of the present disclosure.

Referring to FIG. 9, the discussion will now turn to a high-level description of processing in a switch unit (e.g., 92, FIG. 1) for processing ingress packets in accordance with the present disclosure. In some embodiments, for example, the switch unit can include one or more digital processing units, which when operated, can cause the switch unit to perform processing in accordance with FIG. 9. Digital processing units can include general CPUs that operate by way of executing computer program code stored on a non-volatile computer readable storage medium (e.g., read-only memory, ROM). Digital processing units can include specialized processors such as digital signal processors, graphics coprocessors, field programmable arrays, application specific integrated circuits, etc. that operate by way of executing computer program code or operate by way of being configured for specific operations by program code; for example, packet forwarding logic 516 and queueing logic 520, FIG. 5A can comprise one or more specialized processors. The flow of operations performed by the switch unit is not necessarily limited to the order of operations shown.

At operation 902, the local switch unit receives an ingress packet on one of the (local) physical ports of the switch unit; for example, from a host machine, a network device, etc. For discussion purposes, this switch unit is referred as the "local" switch unit.

At operation 904, the local switch unit identifies an egress port on which to transmit the received ingress packet. In some embodiments, for example, the local switch unit can perform a routing lookup in its forwarding information base (e.g., forwarding table 524, FIG. 5A) to identify an egress port. As explained above, in some embodiments, the local switch unit can incorporate port forwarding information from the global view into the switch unit's forwarding table, and so the forwarding table can include forwarding information for both the switch unit's local ports and for remote ports. If the identified egress port is a physical port on the local switch unit, then processing can proceed to operation 906. If the identified egress port is a physical port that is not on the local switch unit (i.e., a remote port on a remote switch unit), then processing can proceed to operation 908.

At operation 906, the local switch unit transmits the received ingress packet on the local physical port according to the routing protocol supported by its switch unit controller in response to a determination (e.g., operation 904) that the egress port is a local port. Recall that in accordance with some embodiments, switch units in a modular chassis can run instances of different routing protocols. For example, a switch unit in a modular chassis can implement a routing protocol instance different from the routing protocol instance in another switch unit in the same modular chassis. Processing of the received ingress packet can be deemed complete; processing in the local switch unit can return to operation 902 to process the next ingress packet.

At operation 908, the local switch unit prepares the received ingress packet for transmission on a remote port in accordance with the present disclosure in response to a determination (e.g., operation 904) that the egress port is a remote port. In some embodiments, for example, the local switch unit can create packet metadata to be associated with the received ingress packet. Information in the packet metadata can be used by the remote switch unit to process the received ingress packet. In some embodiments, for instance, the packet metadata can include:

the system port ID of the remote egress port, and
the rewrite index associated with the identified remote egress port.

The system port ID can be identified by performing a forwarding lookup operation on the receive ingress packet. The rewrite index can be identified using, for example, global neighbor table 704 (FIG. 7B) and performing lookup based on the destination IP address in the received ingress packet.

At operation 910, the local switch unit enqueues the received ingress packet and its associated packet metadata (collectively referred to herein as a "packet block") on the virtual output queue that corresponds to the identified remote egress port using, for example, global neighbor table 704 (FIG. 7B). In some embodiments, if the remote egress port is a member of a LAG, the local switch unit can identify the port members of the LAG and select the virtual output queue corresponding to one of the port members. In some embodiments, the selection can be based on the number of packets that are enqueued on each virtual output queue in order to load balance packets for egress across member ports of the LAG. If a member port is down, the local switch unit can exclude the virtual output queue that corresponds to the downed port from the selection process.

Processing of the received ingress packet can be deemed complete; processing in the local switch unit can return to operation 902 to receive the next ingress packet.

Figure 10:
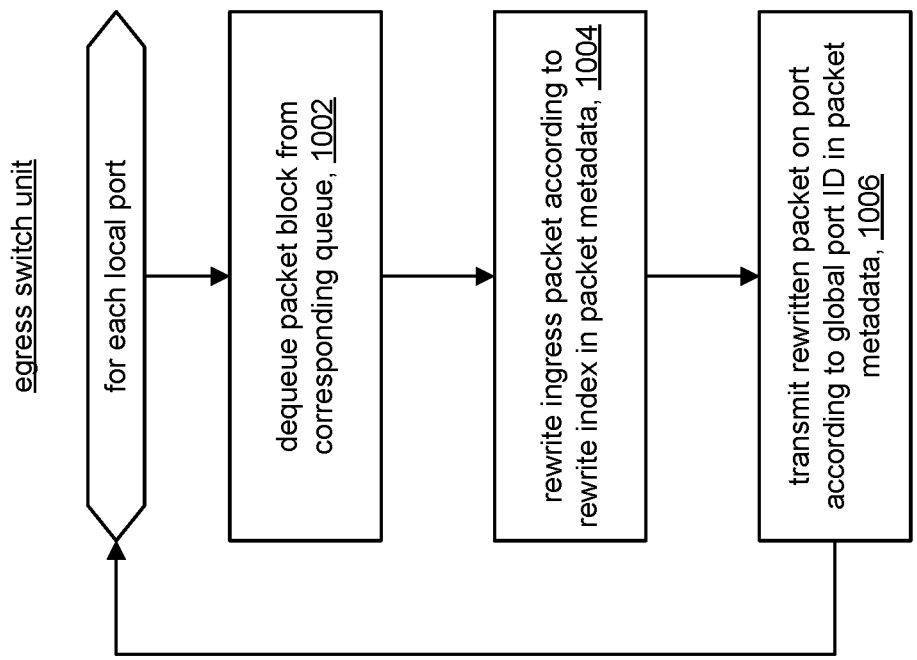
FIG. 10 shows processing of a dequeued packet in a switch unit in accordance with some embodiments of the present disclosure.

Referring to FIG. 10, the discussion will now turn to a high-level description of processing in an egress switch unit (e.g., 102, FIG. 1) for handling packet blocks (received packet and associated packet metadata) received from an ingress switch unit in accordance with the present disclosure. In some embodiments, for example, the switch unit can include one or more digital processing units, which when operated, can cause the switch unit to perform processing in accordance with FIG. 10. Digital processing units can include general CPUs that operate by way of executing computer program code stored on a non-volatile computer readable storage medium (e.g., read-only memory, ROM). Digital processing units can include specialized processors such as digital signal processors, graphics coprocessors, field programmable arrays, application specific integrated circuits, etc. that operate by way of executing computer program code or operate by way of being configured for specific operations by program code; for example, packet forwarding logic 516 and queueing logic 520, FIG. 5A can comprise one or more specialized processors. The flow of operations performed by the switch unit is not necessarily limited to the order of operations shown.

The egress switch unit can perform the following operations for each local port on the egress switch:

At operation 1002, the egress switch unit dequeues packet blocks that have been enqueued on the virtual output queues associated with the egress switch unit. As explained above, a dequeued packet block comprises the ingress packet received by the ingress switch unit and associated packet metadata which includes a rewrite index.

At operation 1004, the egress switch unit rewrites the ingress packet according to the rewrite index contained in the associated packet metadata. In some embodiments, for example, the rewrite actions can be stored in a table. The rewrite index contained in the packet metadata can be used to index into the table to access a set of one or more rewrite actions to be performed on the ingress packet. For example, a packet being IP routed, requires the Ethernet header in the packet to be rewritten with the MAC destination address of the next hop, including rewriting the source address with the MAC address of the destination and decrementing the time to live or hop limit of the packet. The resulting rewritten ingress packet is ready for transmission.

At operation 1006, the egress switch unit transmits (emits) the rewritten packet on the physical port of the egress switch unit that is associated with the virtual output queue from which the packet was dequeued. The transmission is performed in accordance with the routing protocol implemented by the egress switch. It is noted that the egress switch unit does not have to perform a forwarding lookup operation on the received ingress packet to determine the identity of the egress port. Rather, the egress port is immediately known by virtue of the virtual output queue that the packet was dequeued from, thus avoiding the latency due to a forwarding lookup operation. Processing of the received packet can be deemed complete; processing in the egress switch unit can return to operation 1002 to receive the next dequeued packet from an ingress switch unit.

As pointed out, the egress switch unit does not perform a lookup operation in its forwarding tables to identify which local port to transmit the packet because at operation 1002 the virtual output queue that a packet is dequeue from is by definition associated with a particular port on the egress switch. Moreover, a lookup operation in the forwarding tables of the egress switch unit is not required to determine the appropriate rewrite actions because the rewrite actions are identified by the rewrite index provided in the packet metadata. Packet processing in accordance with present disclosure therefore allows for packets to be received at one switch unit (the ingress switch unit) and transmitted on another switch unit (the egress switch unit) without requiring a forwarding/routing lookup operation in the egress switch unit, thus reducing packet forwarding latency. The forwarding lookup performed in the ingress switch unit can identify both the port in the egress switch unit and the rewrite actions to be performed by the egress switch unit.

Figure 11A:
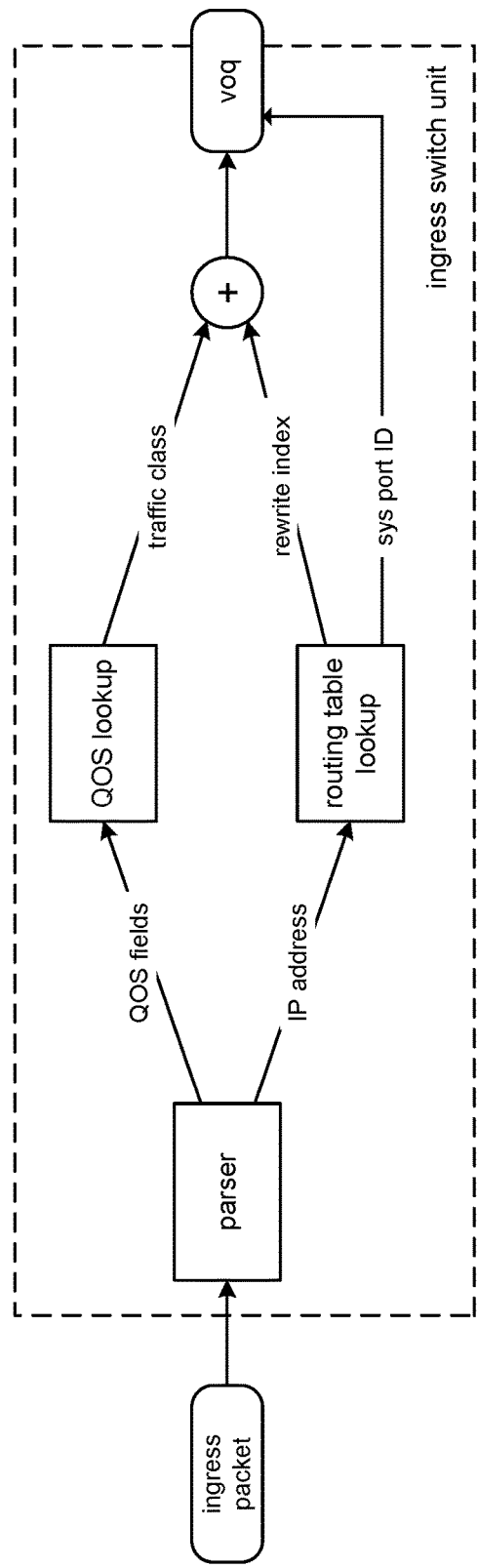
FIGS. 11A and 11B illustrate processing between ingress and egress switch units in accordance with some embodiments of the present disclosure.
Figure 11B:
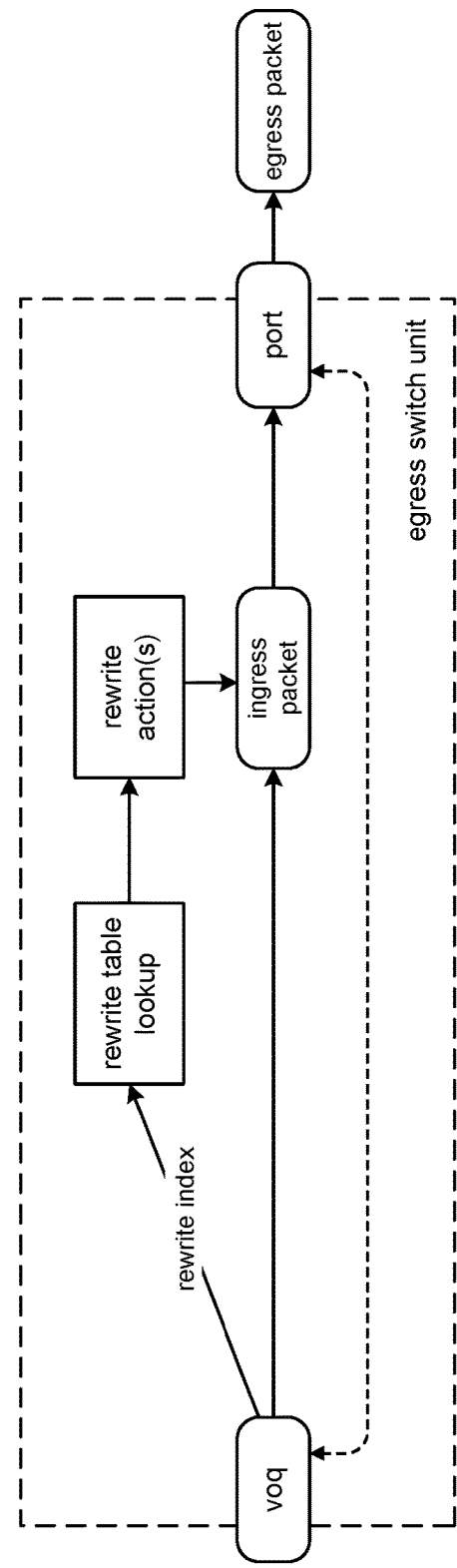

FIGS. 11A and 11B diagrammatically illustrates an example of packet processing in accordance with the present disclosure, where a packet is received in one switch unit but transmitted on another switch unit. FIG. 11A shows an ingress switch unit receives an ingress packet. The ingress packet is parsed to identify, for example, a destination IP address, quality of service (QOS) fields, and so on. A lookup can be performed on the QOS fields to identify a proper traffic class for the ingress packet. A routing table lookup can be performed on the IP address to identify an egress port. As discussed above, in accordance with the present disclosure, the egress port can be on a separate switch unit, and can be identified by its system port ID. Similarly, in accordance with the present disclosure, the routing table lookup can identify a rewrite index. The ingress packet and rewrite index can be combined and enqueued on a VOQ that corresponds to the system port ID. Processing continues with FIG. 11B.

FIG. 11B shows processing in the egress switch unit that is associated with the VOQ. The egress switch unit dequeues the packet block from the VOQ. The dequeued packet block includes the ingress packet received by the ingress switch unit in FIG. 11A and associated packet metadata. The egress switch unit obtains a rewrite index contained in the packet metadata. The rewrite index is used in a rewrite table lookup operation to identify rewrite action(s) to be applied to the ingress packet. The rewritten ingress packet is then transmitted on a physical port of the egress switch unit that corresponds to the VOQ.

Notably, the egress switch unit does not have to perform parsing and forwarding lookup operations. The parsing and forwarding lookup by ingress switch unit identifies the egress port on the egress switch, and by virtue of enqueueing the packet on the VOQ that corresponds to the egress port obviates the need for the egress switch unit to determine the egress port. The ingress switch unit also identifies the rewrite index so that in the egress switch unit, the packet does not need to be parsed in order to determine the rewrite action to be applied.

FURTHER EXAMPLES

In accordance with embodiments of the present disclosure, a method among a plurality of switch units including a first switch unit and a second switch unit, includes the first switch unit receiving a packet and performing a forwarding lookup operation using addressing information in the received packet to identify an egress port and a next hop address. In response to the egress port being on the second switch unit, the first switch unit can use shared forwarding information to: identify a virtual output queue (VOQ) that corresponds to the egress port on the second switch unit; and identify a rewrite index based on the next hop address. The first switch unit can enqueue a packet block on the VOQ, the packet block comprising the received packet and the rewrite index. The second switch unit can dequeue the packet block and modify the received packet contained in the dequeued packet block according to the rewrite index contained in the dequeued packet block. The second switch unit can transmit the modified packet on the port that is associated with the VOQ without performing a forwarding lookup operation in the second switch unit. The first switch unit processing packets in accordance with a first routing protocol instance and the second switch unit processing packets in accordance with a second routing protocol instance different from the first routing protocol instance.

In some embodiments, the shared forwarding information can comprise rewrite indices generated by each of the plurality of switch units, each rewrite index identifying a set of rewrite actions in one of the plurality of switch units; and a plurality of VOQ identifiers, each VOQ identifier uniquely identifying a port on one of the plurality of switch units.

In some embodiments, each of the plurality of switch units can receive the shared forwarding information from a central source and store a respective local copy of the received shared forwarding information. In some embodiments, each of the plurality of switch units can provide its respective local forwarding information to the central source, wherein the central source aggregates the respective local forwarding information received from each of the plurality of switch units to generate the shared forwarding information.

In some embodiments, the second switch unit can identify a set of rewrite actions using the rewrite index contained in the dequeued packet block; and modify the packet contained in the dequeued packet block using the identified set of rewrite actions. In some embodiments, the rewrite actions are stored in the second switch unit.

In some embodiments, the egress port can be a member port of a link aggregate group (LAG) defined on the second switch unit, and the first switch unit can use the shared forwarding information to identify all member ports of the LAG; and select one of the member ports of the LAG as a new egress port. In some embodiments, the shared forwarding information can include LAG information that identifies LAGs defined among the plurality of switch units and identifies member ports for each identified LAG.

In accordance with embodiments of the present disclosure, a modular chassis can include a plurality of switch units including at least a first switch unit and a second switch unit. The first switch unit and the second switch unit can each be configured to receive and process packets in accordance with a routing protocol instance different from the other. The first switch unit can be configured to receive packets in accordance with the first routing protocol instance and perform a forwarding lookup operation using addressing information contained in a packet received on a port of the first switch unit to determine an egress port on which to egress the packet and a next hop address. When the egress port is a port on the second switch unit, the first switch unit can identify a rewrite index and a virtual output queue (VOQ) that is associated with the next hop address; and enqueue the packet and the rewrite index on the VOQ. The second switch unit can be configured to dequeue the packet and rewrite index from the VOQ; modify the packet according to the rewrite index; and transmit the modified packet on a port on the second switch unit that is associated with the VOQ in accordance with the second routing protocol instance, without performing a forwarding lookup operation in the second switch unit.

In some embodiments, when the egress port is a port on the first switch unit, then the packet can be egressed using the first routing protocol instance.

In some embodiments, when the egress port is a member port of a LAG defined on the second switch unit, then the first switch unit can identify all member ports of the LAG and select as a new egress port one of the member ports of the LAG.

In some embodiments, the first switch unit has stored therein a local copy of shared forwarding information that is used to identify the virtual output queue (VOQ) and the rewrite index. In some embodiments, the shared forwarding information comprises rewrite indices generated by each of the plurality of switch units, each rewrite index identifying a set of rewrite actions in one of the plurality of switch units; and a plurality of VOQ identifiers, each VOQ identifier uniquely identifying a port on one of the plurality of switch units.

In some embodiments, each of the plurality of switch units is configured to provide its respective forwarding information to a central server, wherein the shared forwarding information is an aggregation of the respective forwarding information received from the plurality of switch units, wherein each of the plurality of switch units stores a local copy of the shared forwarding information.

In accordance with embodiments of the present disclosure, a distributed switch fabric can include a plurality of switch units including at least a first switch unit and a second switch unit. The first switch unit and the second switch unit each can be configured to receive and process packets in accordance with a routing protocol instance different from the other. The first switch unit can be configured to process a first packet received on a port of the first switch unit in accordance with a first routing protocol instance when the first packet is destined for egress on another port of the first switch unit. The first switch unit can be configured to enqueue a second packet and a rewrite index on a virtual output queue (VOQ) associated with the second switch unit when the second packet is destined for egress on a port of the second switch unit. The second switch unit can dequeue the second packet and rewrite index from the virtual output queue; modify the second packet in accordance with rewrite actions identified by the rewrite index; and transmit the modified second packet on a port on the second switch unit that corresponds to the virtual output queue in accordance with a second routing protocol instance different from the first routing protocol instance.

In some embodiments, the modified second packet can be transmitted by the second switch unit without performing a forwarding lookup operation.

In some embodiments, the first switch unit can store a local copy of shared forwarding information and use the shared forwarding information to identify the virtual output queue and the rewrite index. In some embodiments, the shared forwarding information can comprise rewrite indices generated by each of the plurality of switch units, each rewrite index identifying a set of rewrite actions in one of the plurality of switch units; and a plurality of VOQ identifiers, each VOQ identifier uniquely identifying a port on one of the plurality of switch units.

In some embodiments, the distributed switch fabric can further comprise a modular chassis wherein the plurality of switch units is installed in the modular chassis and interconnected by a communication fabric, wherein the modular chassis is configurable to add switch units and to remove switch units.

In some embodiments, the distributed switch fabric can further comprise a plurality modular chassis interconnected by a communication fabric, each modular chassis comprising at least some of the plurality of switch units installed therein, each modular chassis being configurable to add switch units and to remove switch units.

In some embodiments, the distributed switch fabric can further comprise a plurality of fixed-configuration chassis, each fixed-configuration chassis comprising a fixed number of the plurality of switches.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method among a plurality of switch units including a first switch unit and a second switch unit, the method comprising:
   the first switch unit receiving a packet on a port of the first switch unit;
   the first switch unit performing a forwarding lookup operation using addressing information in the received packet to identify an egress port and a next hop address;
   in response to the egress port being on the second switch unit, the first switch unit using shared forwarding information to:
      identify a virtual output queue (VOQ) that corresponds to the egress port on the second switch unit; and
      identify a rewrite index based on the next hop address;
   the first switch unit enqueuing a packet block on the VOQ, the packet block comprising the received packet and the rewrite index;
   the second switch unit dequeuing the packet block from the VOQ;
   the second switch unit modifying the received packet contained in the dequeued packet block according to the rewrite index contained in the dequeued packet block; and
   the second switch unit transmitting the modified packet on a port of the second switch unit that is associated with the VOQ without performing a forwarding lookup operation in the second switch unit,
   wherein the first switch unit processes packets in accordance with a first routing protocol instance and the second switch unit processes packets in accordance with a second routing protocol instance different from the first routing protocol instance.

2. The method of claim 1, wherein the shared forwarding information comprises:
   rewrite indices generated by each of the plurality of switch units, each rewrite index identifying a set of rewrite actions in one of the plurality of switch units; and
   a plurality of VOQ identifiers, each VOQ identifier uniquely identifying a port on one of the plurality of switch units.

3. The method of claim 1, further comprising each of the plurality of switch units receiving the shared forwarding information from a central source and storing a respective local copy of the received shared forwarding information.

4. The method of claim 3, further comprising each of the plurality of switch units providing its respective local forwarding information to the central source, wherein the central source aggregates the respective local forwarding information received from each of the plurality of switch units to generate the shared forwarding information.

5. The method of claim 1, the method further comprising the second switch unit:
   identifying a set of rewrite actions using the rewrite index contained in the dequeued packet block; and
   modifying the packet contained in the dequeued packet block using the identified set of rewrite actions.

6. The method of claim 5, wherein the rewrite actions are stored in the second switch unit.

7. The method of claim 1, wherein the egress port is a member port of a link aggregate group (LAG) defined on the second switch unit, the method further comprising the first switch unit:
   using the shared forwarding information to identify all member ports of the LAG; and
   selecting one of the member ports of the LAG as a new egress port.

8. The method of claim 7, wherein the shared forwarding information includes LAG information that identifies LAGs defined among the plurality of switch units and identifies member ports for each identified LAG.

9. A modular chassis comprising:
   a plurality of switch units including at least a first switch unit and a second switch unit, wherein each switch unit includes a digital processing unit and memory;

the first switch unit and the second switch unit, each, configured to receive and process packets in accordance with a routing protocol instance different from the other;

the first switch unit configured to:
  receive packets in accordance with the first routing protocol instance;
  perform a forwarding lookup operation using addressing information contained in a packet received on a port of the first switch unit to determine an egress port on which to egress the packet and a next hop address; and
  when the egress port is a port on the second switch unit:
    identify a rewrite index and a virtual output queue (VOQ) that is associated with the next hop address; and
    enqueue the packet and the rewrite index on the VOQ;

the second switch unit configured to:
  dequeue the packet and rewrite index from the VOQ;
  modify the packet according to the rewrite index; and
  transmit the modified packet on a port on the second switch unit that is associated with the VOQ in accordance with the second routing protocol instance, without performing a forwarding lookup operation in the second switch unit.

10. The modular chassis of claim 9, wherein when the egress port is a port on the first switch unit, then egress the packet using the first routing protocol instance.

11. The modular chassis of claim 9, wherein when the egress port is a member port of a LAG defined on the second switch unit, then the first switch unit identifies all member ports of the LAG and selects as a new egress port one of the member ports of the LAG.

12. The modular chassis of claim 9, wherein the first switch unit has stored therein a local copy of shared forwarding information that is used to identify the virtual output queue (VOQ) and the rewrite index.

13. The modular chassis of claim 12, wherein the shared forwarding information comprises:
  rewrite indices generated by each of the plurality of switch units, each rewrite index identifying a set of rewrite actions in one of the plurality of switch units; and
  a plurality of VOQ identifiers, each VOQ identifier uniquely identifying a port on one of the plurality of switch units.

14. The modular chassis of claim 12, wherein each of the plurality of switch units is configured to provide its respective forwarding information to a central server, wherein the shared forwarding information is an aggregation of the respective forwarding information received from the plurality of switch units, wherein each of the plurality of switch units stores a local copy of the shared forwarding information.

15. A distributed switch fabric comprising:
  a plurality of switch units including at least a first switch unit and a second switch unit, wherein each switch unit includes a digital processing unit and memory;
  the first switch unit and the second switch unit each configured to receive and process packets in accordance with a routing protocol instance different from the other;
  the first switch unit configured to process a first packet received on a port of the first switch unit in accordance with a first routing protocol instance when the first packet is destined for egress on another port of the first switch unit;
  the first switch unit configured to enqueue a second packet and a rewrite index on a virtual output queue (VOQ) associated with the second switch unit when the second packet is destined for egress on a port of the second switch unit,
  wherein the second switch unit:
    dequeues the second packet and rewrite index from the virtual output queue;
    modifies the second packet in accordance with rewrite actions identified by the rewrite index; and
    transmits the modified second packet on a port on the second switch unit that corresponds to the virtual output queue in accordance with a second routing protocol instance different from the first routing protocol instance.

16. The distributed switch fabric of claim 15, wherein the modified second packet is transmitted by the second switch unit without performing a forwarding lookup operation.

17. The distributed switch fabric of claim 15, wherein the first switch unit stores a local copy of shared forwarding information and uses the shared forwarding information to identify the virtual output queue and the rewrite index.

18. The distributed switch fabric of claim 17, wherein the shared forwarding information comprises:
  rewrite indices generated by each of the plurality of switch units, each rewrite index identifying a set of rewrite actions in one of the plurality of switch units; and
  a plurality of VOQ identifiers, each VOQ identifier uniquely identifying a port on one of the plurality of switch units.

19. The distributed switch fabric of claim 15, further comprising a modular chassis wherein the plurality of switch units is installed in the modular chassis and interconnected by a communication fabric, wherein the modular chassis is configurable to add switch units and to remove switch units.

20. The distributed switch fabric of claim 15, further comprising a plurality modular chassis interconnected by a communication fabric, each modular chassis comprising at least some of the plurality of switch units installed therein, each modular chassis being configurable to add switch units and to remove switch units.

21. The distributed switch fabric of claim 15, further comprising a plurality of fixed-configuration chassis, each fixed-configuration chassis comprising a fixed number of the plurality of switches.

* * * * *